Jan. 11, 1938.  F. R. ZIMMERMAN  2,105,105
MACHINE FOR ELECTRICALLY HEATING SPRINGS
Filed Aug. 19, 1936   6 Sheets-Sheet 1

Witness:
E. Camporini

Inventor:
Fred R. Zimmerman,
By: Rudolph M. Lotz
Attorney.

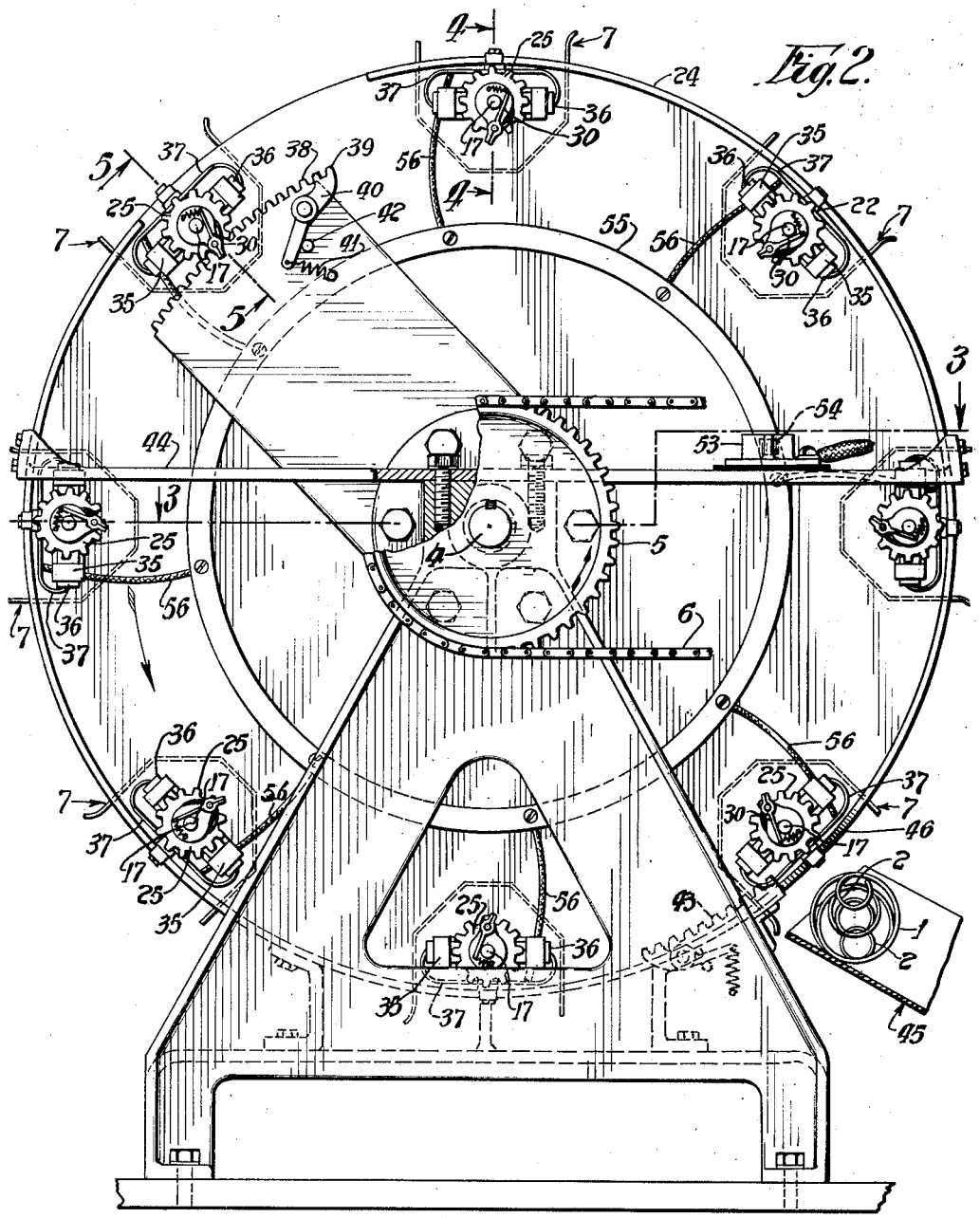

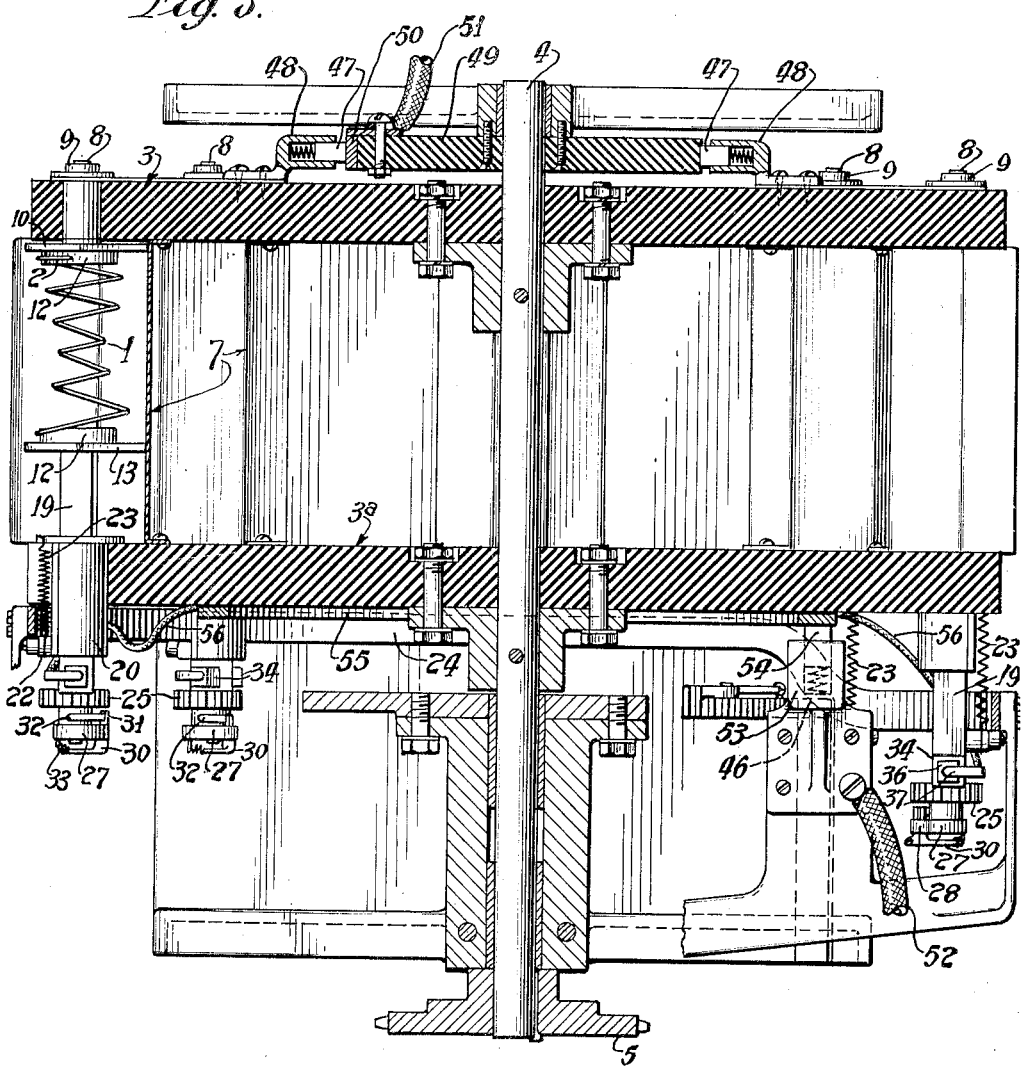

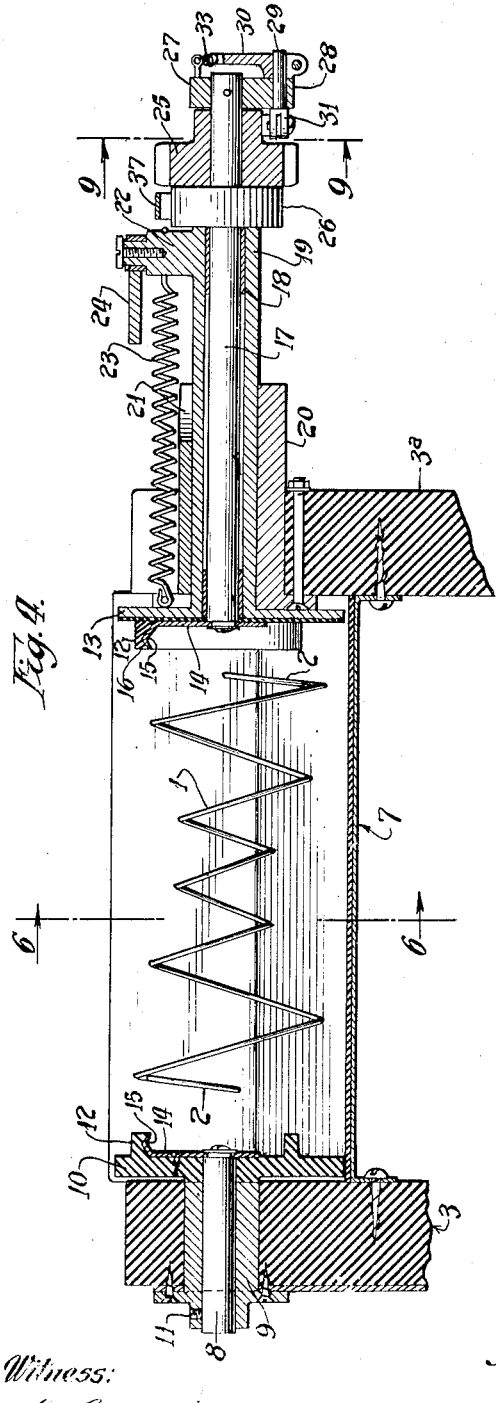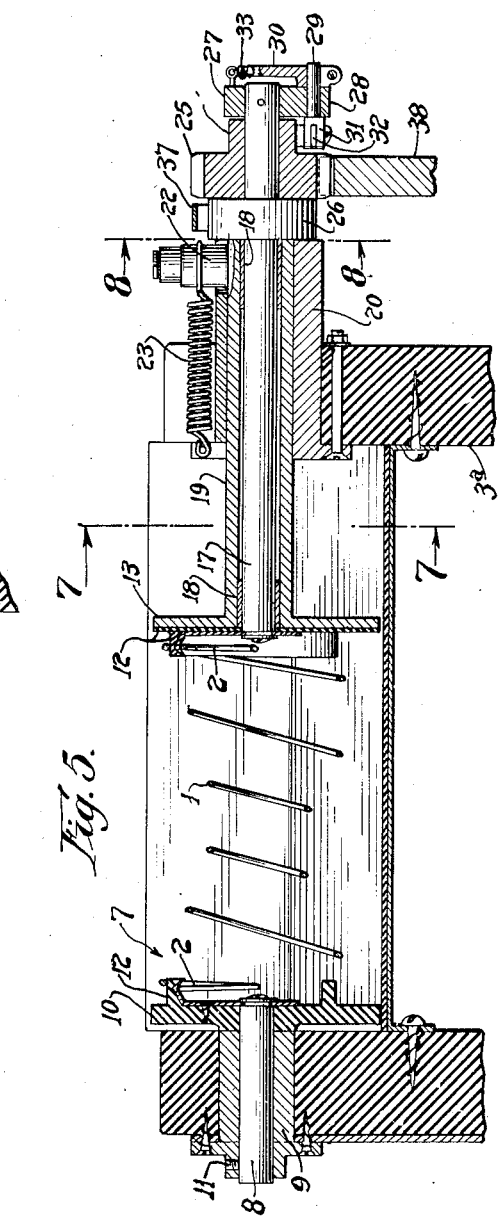

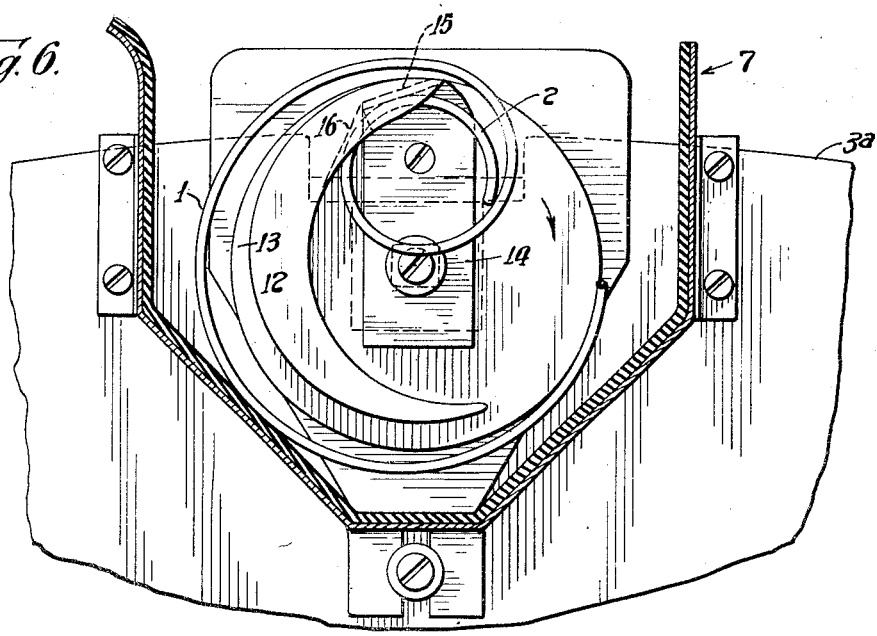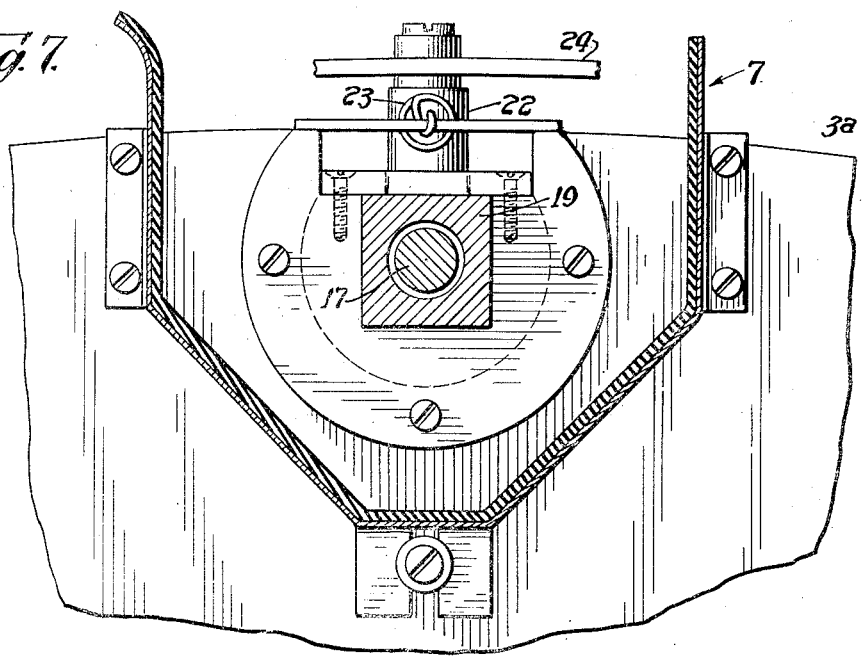

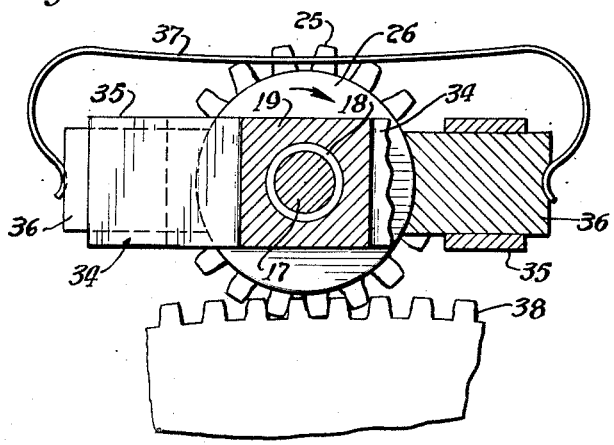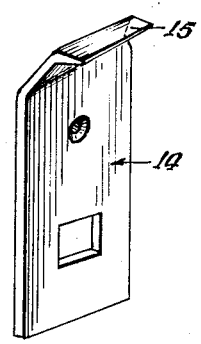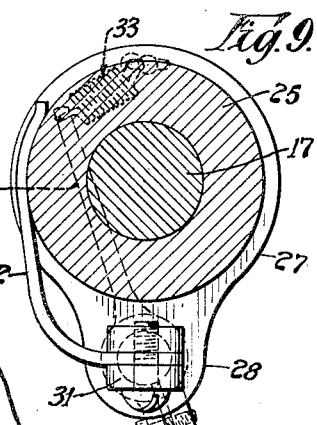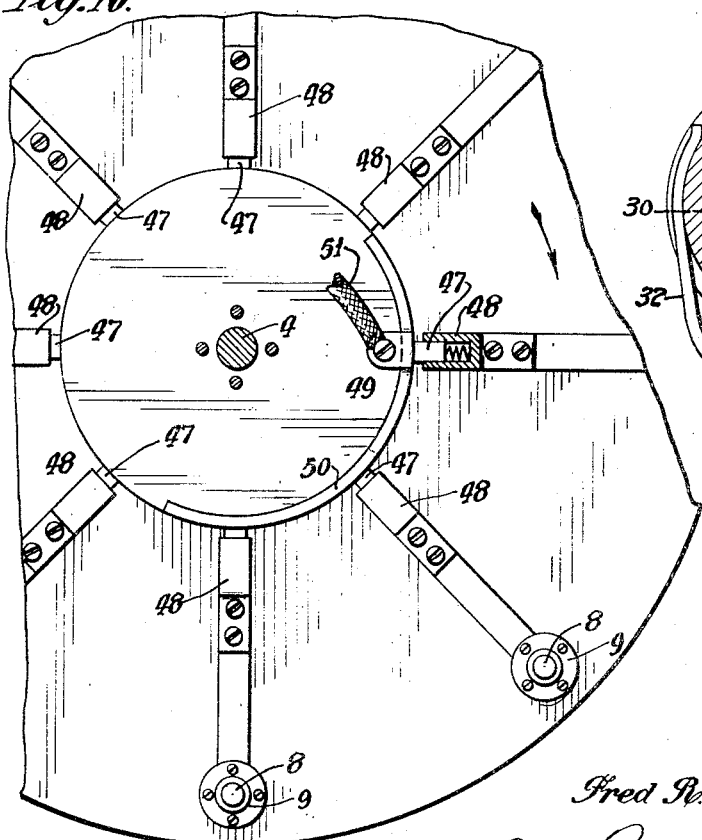

Patented Jan. 11, 1938

2,105,105

UNITED STATES PATENT OFFICE 2,105,105

MACHINE FOR ELECTRICALLY HEATING SPRINGS

Fred R. Zimmerman, Chicago, Ill., assignor to Nachman Spring-Filled Corporation, Chicago, Ill., a corporation of Illinois Application August 19, 1936, Serial No. 96,715

14 Claims. (Cl. 219—11)

The main object of the present invention is to provide a machine for heating springs to a predetermined temperature as a primary step in the hardening or tempering thereof and, more particularly, to provide a machine of this type which is adapted to effecting such heating of predetermined portions of springs, as for example, all except one or both terminal end portions of the same, so that the ultimately hardened or tempered spring will be ductile except throughout the hardened or tempered portion thereof.

The instant machine is intended and adapted to effect the heating, substantially throughout their length, of springs of the type hereinafter pointed out, and is particularly designed and intended to carry out other objects of the invention which are pointed out in or will be readily understood from the following specification.

A suitable embodiment of the invention is illustrated in the accompanying drawings, wherein, Fig. 1 is a side elevation of a machine constructed in accordance with the invention.

Fig. 2 is a front elevation of the same, partly in section.

Fig. 3 is a plan section of the same on the line 3—3 of Fig. 2.

Fig. 4 and Fig. 5 are fragmentary detail sectional views on the lines 4—4 and 5—5, respectively, of Fig. 2.

Figure 1:
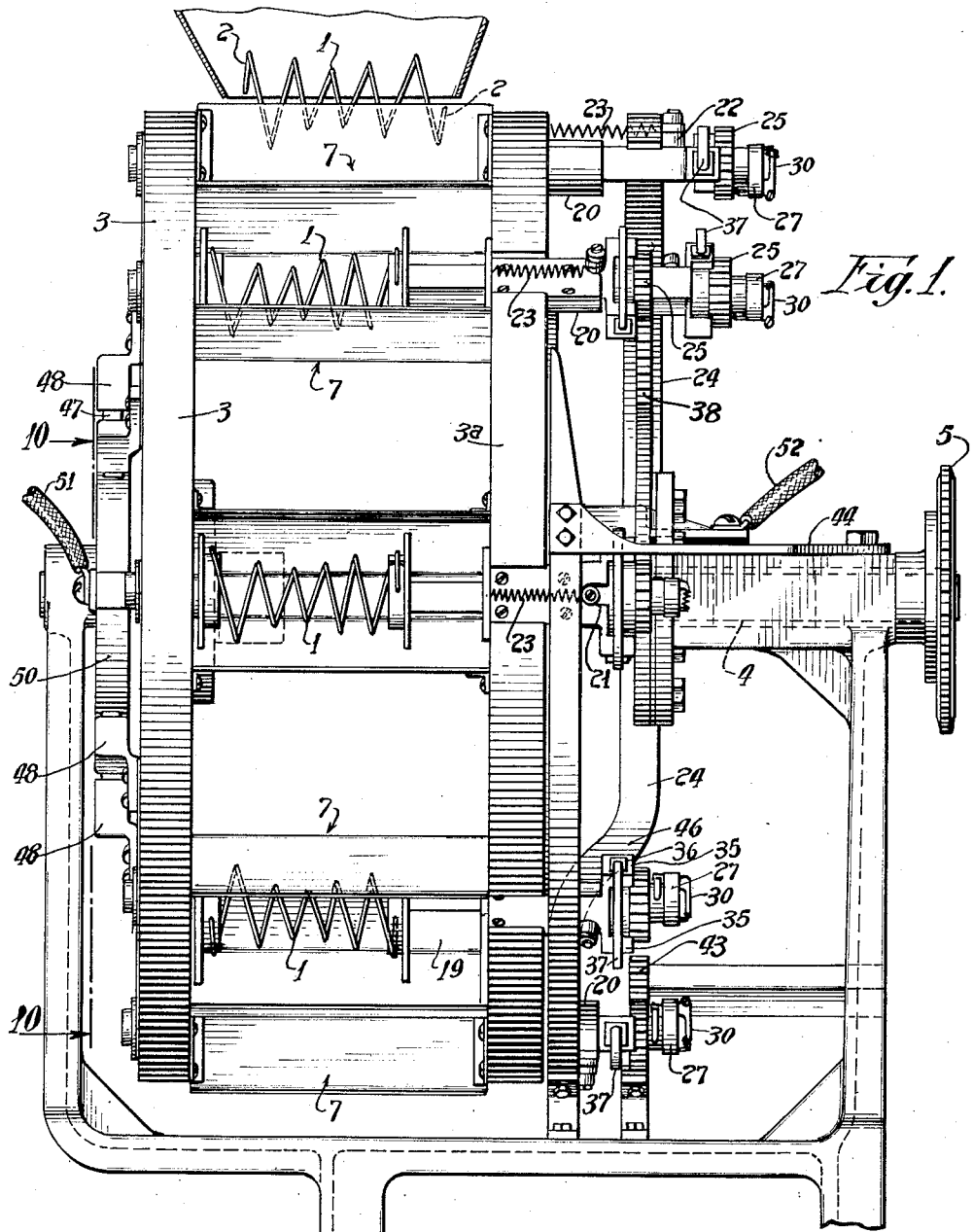

Fig. 6 and Fig. 7 are fragmentary detail vertical sections on the lines 6—6 and 7—7, respectively, of Figs. 4 and 5, respectively.

Fig. 8 is a fragmentary detail vertical sectional view on an enlarged scale on the line 8—8 of Fig. 5.

Fig. 9 is a detail vertical sectional view on the line 9—9 of Fig. 4.

Fig. 10 is a vertical sectional view on the line 10—10 of Fig. 1.

Fig. 11 is a perspective view of a contact plate employed.

In the upholstery art, and particularly in the spring assembly manufacturing art, a large proportion of the upholstery springs employed, are of the type wherein the terminal end portions of the springs are of smaller dimensions than the next adjacent coils. In all upholstery springs, other than the cone or truncated cone type, the last-mentioned coils are of a mesne diameter equal to or greater than the intervening coils or convolutions, the extremities of said springs being radially as far or farther removed from the axis of the spring than any point in said intervening or body coils.

Springs of the last-mentioned types are adapted to be heated throughout substantially any selected portion of their length by means of the machine constituting the subject matter of my application for patent, Serial No. 87,891, filed June 29, 1936, but the type of spring 1, having inturned terminal end portions 2, shown in Fig. 6, are more difficult of becoming properly engaged with the terminals of an electric circuit at points disposed closely proximate to their extremities as possible in order that the greatest possible portions of the lengths of said springs may be heated preparatory to effecting hardening or tempering thereof, than the type spring shown in said application, Serial No. 87,891.

In order to prevent the formation of electric arcs at the points of contact of the springs with the terminals of the electric circuit to be passed through the spring for heating the same, a very close contact of sufficient area to carry the current is required to be effected, as otherwise, the spring will be burned and become brittle and easily breakable at said contact points. Partial compression of the springs against contact elements has been demonstrated to be inadequate to prevent frequent formation of arcs or of too great heating of the springs at said points of contact because of lack of sufficient contact area, and also to the limit of partial compression of the springs which is insufficient to secure ample firmness of contacts.

In the case of the type of spring illustrated, in part, in Fig. 6. compression of the springs must be limited while such compression is utilized for effecting rotation of the spring to bring the terminal end portions first into contact with the circuit terminals and then expanding the springs radially to crown and maintain said terminal end portions into very firm contact with said terminals 2 over a sufficient area of wire to carry the electric current without heating the contact portions to a higher degree than the body of the spring, 1.

As shown in Figs. 1 and 2, the machine comprises a rotatable carrier 3 mounted upon a horizontal shaft 4 which is suitably geared by means of sprocket wheel 5 and sprocket chain 6 to a conventional spring-producing machine or "coiler", as it is commonly called, to cause said carrier 3 to rotate in synchronism with the rate of delivery of springs from the coiler in order that said successive springs will be delivered into the troughs 7 on said carrier 3 between the front and rear plates of the latter.

Associated with each of the troughs 7 and mounted in one end of the latter upon shafts 8 disposed in bearings 9 disposed in one of the last-named plates of the carrier 3, are plates or members 10 of insulating material. The said shafts 8 are adjustable in the bearings 9 and are secured firmly in adjusted position by means of set screws 11. (See Fig. 4.)

Each of the plates 10 is equipped with an arcuate flange or rib 12, also of insulating material (shown in detail in Fig. 4) wherein the plate 13 opposed to said plate 10 is illustrated. The arcuate length of said flange or rib 12 is slightly greater than 180 degrees.

Mounted upon each of said plates 10 and 13 is a metal strip 14 equipped at one end with a shallow U- or V-shaped flange 15, shown in detail in Fig. 11, said flange, as shown in Fig. 6, being disposed in a recess formed in one end of the arcuate member 12 of insulating material. Said recess is equipped with an angular wall 16, illustrated in Fig. 6 in dotted lines, into which the end coil 2 of the spring 1 is adapted to engage, as hereinafter more fully described. The said plates 10 and 13 and the members 12 and 14 are rigidly connected with the shafts 8 and 17, respectively. The shaft 17 is rigid with the hub of the insulating plate 13 and with the insulating sleeve 18 mounted in opposite end portions of a square hollow shaft 19. The latter is slidable in a bearing 20 carried by the outer end plate 3a of the carrier 3.

The said bearing 20 is provided at one side with an end recess 21 into which the projection 22, at one end of the shaft 19, is adapted to be received when said shaft 19, and parts carried thereby, are disposed in the position shown in Fig. 5 and to which position said sleeve is moved by means of the tension spring 23. The said projection 22 carries an anti-friction roller which rides upon an arcuate cam 24 (Figs. 1 and 2) concentric and aligned with the periphery of the plate 3a through an arc of about one hundred sixty degrees, said cam serving to bring the shaft 19 to the position of Fig. 4 against the action of the spring 23.

The shaft 17 is equipped at one end with a spur gear pinion 25 which is loose thereon. The said shaft 17 is also equipped with a collar 26 disposed between the spur gear pinion 25 and the outer end of the hollow shaft 19, said collar 26 being rigid with said shaft 17.

At its outer extremity, the said shaft 17 is equipped with a collar 27, rigid therewith, which is shown in detail in Fig. 9. Said collar 27 is provided with a projection 28 having an opening in which the shaft 29, rigid with a lever 30 is journalled. The shaft 29 is equipped with a bifurcated head 31 in which one end of a flat spring 32 is engaged. The outer end portion of the said spring 32 bears against the hub of the spur gear pinion 25. The lever or arm 30 is engaged at one end with a tension spring 33 secured at its other end to the collar 27 for maintaining the spring 32 engaged with the hub of the spur gear pinion 25. Said collar 27 and parts connected therewith constitute a friction clutch which acts to cause the shaft 17 to rotate responsively to rotation of the spur gear pinion 25.

The collar 26 is of metal and, as shown in Fig. 8, the outer end of the square shaft 19 is equipped with bracket arms 34 carrying rectangular bearings 35 in which electrical contact brushes 36 are slidable. A flat spring 37 having arcuate end portions engaged with the outer ends of the brushes 36 maintains the latter in yielding contact with said collar 26.

Referring now to Fig. 2, it will be noted that the springs delivered from the coiler pass successively into uppermost troughs 7, which are carried anti-clockwise from its spring-engaging position consecutively to the several positions illustrated, there being eight of said troughs 7, in the instance illustrated, equally spaced from each other.

Prior to the time that a trough 7 reaches the position wherein the spur gear pinion 25 thereof, is engaged with the segmental spur gear member 38 which is rigid with the machine frame, one of the teeth of said pinion will engage the outer end or tooth portion 39 of the lever 40, pivotally mounted upon said gear element, 38. Said lever 40 is held by means of the tension spring 41 in contact with a stop pin 42, the latter serving to determine the position of the tooth 39 with respect to the teeth of the gear element 38. The cam 24 terminates at a point just beyond the spring-receiving positions of the troughs 7 so that the anti-friction rollers of the projections 22 are disengaged from said cam almost immediately after a spring has been delivered to a trough 7. The spring 23 then acts to bring the pinion 25 into position to mesh with the gear element 38.

As the pinions 25 successively reach the positions wherein the teeth thereof must be brought into mesh with the teeth of the gear member 38, the said lever 40 serves to cause such meshing of teeth in a well-known manner.

During the period of travel of the trough 7 through the arc defined by the teeth of the gear element 38, the shaft 17 and the plates 13 and 14, and the arcuate member 12 carried thereby are rotated. At this time, the spring 1 disposed within the trough 7 is partially compressed, as shown in Fig. 5, and the rotation of the shaft 17 causes the plate 14 rigid with said shaft, to be rotated, and thus causes said spring to be rotated in the direction of the arrow of Fig. 6 until the other terminal coil 2 of said spring 1 is engaged with the flange 15 of the plate 14 mounted on the plate 10, as shown in Fig. 6. Owing to the angularity of the walls 16 of the recesses in which said end portions 2 of the spring are received, as illustrated in Fig. 6, said spring 1 will be prevented from rotating through a longer arc than is required to bring the terminal coils into firm engagement with the flanges 15 of the plates 14.

In Fig. 2, there is illustrated, in dotted lines, an arcuate gear element 43 which is almost diametrically opposed to the toothed end of gear element 38 and is positioned to mesh with and rotate the gear pinions 25 in the reverse direction. Thus, the springs 1 are successively disengaged from the flange 15 of the plates 14 directly after being heated, but are maintained under partial compression until the shaft 17 associated with said spring is restored to the position of Fig. 4.

The cam 24 is rigidly secured to the machine frame by means of bracket members 44. Disposed opposite the lower end of said cam 24 is a trough 45 into which the heated springs are discharged. The end portion of the cam 24 inclines relatively abruptly outwardly from a sharp end portion to the crown thereof, as shown by the ogee curved portion 46 of said cam in Fig. 1. This ogee curved portion of said cam causes the shaft 17, and parts connected therewith, to be restored to the position shown in Fig. 4 as the anti-friction roller of the projection 22 rides over said portion 46.

During the period of travel of each trough 7, the spring-held brushes 47 mounted in the hollow ends of metallic members 48, which are connected with the bearings for the shafts 8, are in contact with the periphery of the circular plate 49 disposed parallel with and between the inner plate 3 and the machine frame and concentric with the shaft 4 (see Fig. 3).

Said plate 49 is composed of insulating material and is equipped in part with the arcuate metallic plate or strip 50 (Fig. 10) which is connected by means of wire 51 with one terminal of the electric circuit to close the same through successive springs 1 between points of contact of coils 2 with the flanges 15 of the plates 14. During the period of engagement of each brush 47 with the said metallic ring 50, current will flow from said ring 50 through the member 48 to the bearing for and through the shaft 8 to the plate 14 carried by the plate 10.

The other terminal of the electric circuit is, as shown in Fig. 3, connected by means of wire 52 with a bracket member mounted upon the frame of the machine. Said bracket member is equipped with a sleeve 53 carrying a spring-held brush 54 which is maintained constantly engaged with a metallic ring 55 mounted upon the outer end plate 3a of the carrier (see Fig. 2). Said ring 55 is connected by means of the wires 56 with the several pairs of brushes 36 to close the electric circuit through the collars and shafts 17 and plates 14, carried by the insulating plates 13, to close the circuit through the spring 1 during the period of contact of the successive brushes 47 with the arcuate ring 50.

Obviously, the duration of passage of electric heating current through the successive springs will be determined by the speed of rotation of the carrier 3, the gauge of wire of which the spring is composed and the tension and volume of the electric heating current, and the arcuate length of the ring segment 50. The speed of rotation of said carrier 3 will be determined by the number of troughs 7 which it carries and the speed at which the coiler delivers springs.

Generally speaking, the electric current is passed through each spring for a period approximating five seconds and immediately upon opening the circuit through each of said springs, the latter is discharged into said trough 45 which delivers the springs to the means for further treating the same, while hot, to harden or temper the heated portions of the same.

During the heating of the portions of the springs determined by points of contact of its coils 2 with the flanges 15 of the plates 14, the adjacent portions of the end coils will be heated to some degree by convection so that there is no sharp line of demarcation between the hardened or tempered portion of the completed spring and said terminal end portion.

I claim as my invention:

1. In a machine of the type specified, a receptacle for successively receiving springs at predetermined intervals, means within the receptacle for partially compressing each spring, electrically conductive members constituting terminals of an electric circuit carried by said means, mechanism for actuating said means to compress the spring and maintain the same compressed during a predetermined time interval, mechanism for rotating one of said members relatively to the other thereof for engaging the same with and disengaging the same from terminal end portions of the spring at the beginning and end, respectively, of said time interval for closing and opening the circuit through the body of the spring, and mechanism for restoring said means to normal position and effect complete release of the spring and its discharge from the receptacle immediately following its disengagement from said members.

2. A machine of the type specified comprising a rotating carrier, a series of spring-receiving devices thereon, mechanism for automatically compressing the respective springs in said devices at one point in the travel of the carrier, members associated with said mechanism and constituting terminals of an electric circuit for engaging opposite end portions of said springs, means included in said mechanism for rotating the compressed springs for engaging the end portions of the springs with said members automatically during an arc of travel of said carrier immediately following its attainment of said spring-compressing position, and means associated with said members for connecting the same with the electric circuit automatically throughout the next succeeding arc of travel of the carrier and disconnecting said members from said circuit as said carrier completes the last-mentioned arc of travel, mechanism for automatically releasing the springs from said members and receiving means during a further arc of travel of the carrier and maintaining the spring-engaging mechanism and devices in relative initial positions until the said carrier has completed a revolution.

3. In a machine of the type specified, a rotatable carrier equipped with a series of spring-receiving members arranged to receive springs consecutively as each thereof attains a predetermined point in the travel of the carrier, means associated with said members for connecting opposite end portions of the springs with the terminals of an electric circuit through a predetermined arc of travel of the carrier, mechanism associated with said means for automatically compressing the springs and effecting connection of opposite ends thereof with said means during an arc of travel of said carrier preceding the last-mentioned travel thereof, means associated with said mechanism for automatically reversing the latter and restoring the same to initial position during an arc of travel of the carrier from the termination of its preceding arc of travel to the point of completion of a revolution thereof, thereby to effect automatic release and discharge of the springs successively at a given point in the travel of the carrier.

4. An automatic machine of the type specified comprising a rotating carrier equipped with a series of equally spaced apart receptacles, each adapted to receive a spring as it attains a given point in the travel of the carrier, metallic devices at opposite ends of each receptacle for engaging opposite end portions of said springs at predetermined points, mechanisms associated with said receptacles for effecting partial compression of the springs at a predetermined point in the travel of the carrier and during a succeeding arc of movement of said carrier causing said devices to be brought into engagement with said points on said springs, means for effecting and maintaining electrical connection of said devices with the respective terminals of an electric circuit during a succeeding predetermined arc of travel of said carrier, means arranged to engage and actuate said mechanism for restoring the same to and maintaining it in its initial position during the balance of travel of the carrier to complete a revolution thereof thereby to effect release of said springs from said devices at one point and discharge of springs from said receptacles successively at another point in the last-mentioned travel of said carrier.

5. An automatic machine of the type specified comprising a carrier, a spring-receiving receptacle mounted thereon and arranged to receive a spring at one point and discharge the same at another point in its travel, mechanism associated with said receptacle for effecting and maintaining partial compression of a contained spring throughout a portion of the first-mentioned travel of said receptacle, electrical contact members associated with said receptacle and said mechanism for engaging predetermined points in opposite end portions of the contained and compressed spring, means actuating said mechanism for effecting a relative movement between the said contact members and said spring for bringing the former into contact with said points in the latter immediately following compression of the spring, electrical switch means arranged to effect and maintain connection between the contact devices and the spring throughout a predetermined length of travel of the receptacle between the last-mentioned travel of same and its attainment of a spring discharging position, and means disposed between the said discharge position and the termination of the next preceding travel of the carriage for reversing the said mechanism to effect complete release of the spring to permit discharge thereof and restore said mechanism to its initial position.

6. In an automatic machine of the type specified, a spring-receiving receptacle, an electrically conductive spring-engaging stop at one end thereof, a rotatable electrically conductive similar stop at the other end thereof, mechanism for bringing opposite end portions of a spring disposed in said receptacle into position for engagement with said stops, means included in said mechanism for effecting rotation of said second stop for engaging and rotating the spring until the same is engaged with the first-named stop, means associated with said mechanism for connecting the said stops with the terminals of an electric heating circuit for closing the latter through the portion of the spring disposed between its points of engagement with said stops and maintaining said circuit closed during a selected time interval, and means associated with said mechanism for restoring the latter to normal position following said time interval for releasing the spring from said stops to permit its discharge from said receptacle.

7. In an automatic machine of the type specified, a spring-receiving receptacle, an electrically conductive spring-engaging stop at one end thereof, a rotatable electrically conductive similar stop at the other end thereof, mechanism for bringing opposite end portions of a spring disposed in said receptacle into position for engagement with said stops, means included in said mechanism for effecting rotation of said second stop for engaging and rotating the spring until the same is engaged with the first-named stop, means associated with said mechanism for connecting the said stops with the terminals of an electric heating circuit for closing the latter through the portion of the spring disposed between its points of engagement with said stops and maintaining said circuit closed during a selected time interval, and means associated with said mechanism for restoring the latter to normal position following said time interval for releasing the spring from said stops, and means for disposing said receptacle in spring discharge position to cause the contained spring to be discharged therefrom as the same is released from said stops.

8. In an automatic machine of the type specified, a spring-receiving receptacle, an electrically conductive spring-engaging stop at one end thereof, a rotatable electrically conductive similar stop at the other end thereof, opposed members associated with said stops, means actuated in one direction by a spring for moving said members toward each other to partially compress the spring and position the end portions thereof for engagement with said stops, a frictionally driven shaft carrying the rotatable stop, a device associated with said means for causing spring actuation thereof and subsequently restoring the same to initial position against the action of said spring, mechanism for effecting rotation of said shaft following spring actuation of said means for successively engaging said stops with opposite end portions of said spring, mechanism for reversing the rotation of said shaft preceding restoration of said means to initial position for releasing the spring from said stops, and means associated with said mechanisms for electrically connecting said stops with terminals of an electric circuit for closing the latter through the portions of the spring disposed between said stops during a selected time interval of its engagement with said stops.

9. In a machine of the type specified, a spring-receiving receptacle, relatively movable spring-actuated means between which the spring is initially loosely disposed for compressing the same, relatively rotatable stops associated with said means, mechanism associated with said stops and said means for effecting relative rotation of said stops for engaging the latter with opposite end portions of the compressed spring, a device associated with said means for causing the same to be spring-actuated and for subsequently restoring the same to initial position against the spring actuation thereof, said device and said receptacle and means being movable relatively to each other, mechanism for effecting relative rotation of said stops reversely of the first-mentioned direction to release the spring prior to restoration of the compressing means and after lapse of a time interval of relative movement of said receptacle and said device, and means for connecting and maintaining said stops connected with the terminals of an electric circuit during a portion of said time interval for closing said circuit through the portion of the compressed spring disposed between said stops.

10. In a machine of the type set forth, a traveling carrier, a spring receptacle carried thereby, a device rigid with one end of said receptacle equipped with an electrically conductive member with which one end portion of the spring in the receptacle is adapted to be engaged, a similar rotatable conductive member disposed at the other end of the receptacle and movable longitudinally of said receptacle, a device rigid with said second member for compressing the spring in the receptacle as said second member approaches the first member, mechanism for actuating said last-named device for maintaining the spring compressed during a predetermined length of travel of the carrier, mechanism for rotating said second member relatively to the first member while said spring is maintained compressed for firmly engaging opposite end portions of the spring with said members, means for automatically passing an electric heating current through said spring while the same is engaged with said members and during another predetermined length of travel of said carrier, mechanism for reversing the rotation of the second member at the end of the last-mentioned travel of said carrier to disengage the spring from said member while it is still compressed, and means for effecting complete release of the spring and its discharge from the said receptacle substantially immediately following the completion of the last-mentioned travel of the carrier and effecting restoration of devices and said members to their initial positions and so maintaining the same until the carrier has brought the receptacle to a position to receive another spring.

11. In a machine of the type specified, a spring-receiving member, means at opposite ends of said member for electrically connecting a spring carried by said member with a source of electric current for heating the same, mechanism associated with said member and said means for effecting relative longitudinal and rotary movement between the spring and said means for connecting opposite end portions of the spring with said means, and means for reversing the relative movements of said spring and said first-named means and restoring said mechanism to its initial position.

12. In a machine of the type specified, a spring-receiving member, means at opposite ends of said member for electrically connecting a spring carried by said member with a source of electric current for heating the same, mechanism associated with said member and said means for effecting relative longitudinal and rotary movement between the spring and said means for connecting opposite end portions of the spring with said means, mechanism spaced from said first named mechanism for reversing the relative movements of said spring and said first-named means and restoring said mechanisms to their initial positions, and mechanism for effecting travel of said member through the space separating said mechanism for controlling the time interval of connection of the spring with the first-named means.

13. In an automatic machine of the type specified, a carrier for a spring, a device for feeding springs successively to the carrier at predetermined time intervals, mechanism associated with said carrier and equipped with means for connecting opposite end portions of a spring carried thereby with a source of electric current for heating the body of the spring and including means for imparting relative longitudinal and rotary motion between said first-named means and said spring for effecting engagement of the latter with the former, a cam controlling the time interval of connection of the spring with the first-named means, and devices for actuating said mechanism to rotate the same in respectively opposite directions at spaced apart intervals for engaging the spring with and disengaging the same from said first-named means, said cam acting to restore said mechanism to initial position following disengagement of said first-named means from said spring.

14. In an automatic machine of the type specified, a carrier for a spring, a device for feeding springs successively to the carrier at predetermined time intervals, mechanism associated with said carrier and equipped with means for connecting opposite end portions of a spring carried thereby with a source of electric current for heating the body of the spring, a spring and a cam cooperating to bring said means into engaging relation to said spring, means for actuating said mechanism for imparting relative rotary movement to said first-named means and said spring for engaging the latter with and disengaging from the former at spaced intervals, said cam operating to restore said mechanism to initial position against the action of said spring following disengagement of the latter from said first-named means.

FRED R. ZIMMERMAN.